DRIVE CIRCUIT FOR MAGNETIC HEADS

Filed Dec. 31, 1958 2 Sheets-Sheet 1

INVENTOR.
JOHN D. FOGARTY

William G. Miller Jr.
AGENT

*INVENTOR.*
JOHN D. FOGARTY

William G. Miller Jr.
AGENT

United States Patent Office 3,076,969
Patented Feb. 5, 1963

3,076,969
DRIVE CIRCUIT FOR MAGNETIC HEADS

John D. Fogarty, Philadelphia, Pa., assignor to Sperry Rand Corporation, New York, N.Y., a corporation of Delaware Filed Dec. 31, 1958, Ser. No. 784,339
5 Claims. (Cl. 346—74)

This invention relates to driving circuits for providing a writing current in a magnetic head in either of two opposite directions to produce a magnetic record in which the magnetic flux can be oriented in either of two opposite directions. More particularly, this invention is concerned with driving circuits to provide a cycle of oppositely oriented flux patterns in a magnetic record surface with the phase of the cycle corresponding to either of two values of information to be recorded.

In producing magnetic records in which either of two values of information is recorded as oppositely oriented flux patterns, driving circuits utilizing vacuum tube amplifiers have been utilized in the past. In order to provide a greater dependability, it is desirable to have the driving circuit utilize solid-state amplifying devices in place of vacuum tubes. This invention makes use of such solid-state amplifying devices such as the magnetic amplifier to produce the desired orientation in the flux pattern recorded in the record surface.

It is an object of this invention to provide an improved driving circuit for magnetic heads.

It is a further object of this invention to provide an improved driving circuit for magnetic heads utilizing only solid-state amplifying devices.

Another object of this invention is the provision of an improved driving circuit for magnetic heads which produces cycles of alternate flux patterns oriented in opposite directions in a record surface.

A further object of this invention is the provision of an improved driving circuit for magnetic heads in which the maximum current through the head is limited without also limiting the rate of its rise.

Still a further object of this invention is the provision of an improved driving circuit utilizing solid-state amplifying elements driving the full primary of a coupling transformer.

In carrying out this invention, there is provided a first and second solid-state amplifier responsive to a first and second input respectively. These amplifiers are connected to provide current flow through a magnetic recording head in one direction in response to the first input and in the other direction in response to the second input. Thus, there is provided a recorded flux pattern in one direction in response to the first input and the opposite direction in response to the other input.

The foregoing objects, the advantages, construction, and operation of the present invention may be best understood from the following description and accompanying drawings in which like reference numerals refer to like parts and in which.

Figures 1, 3:
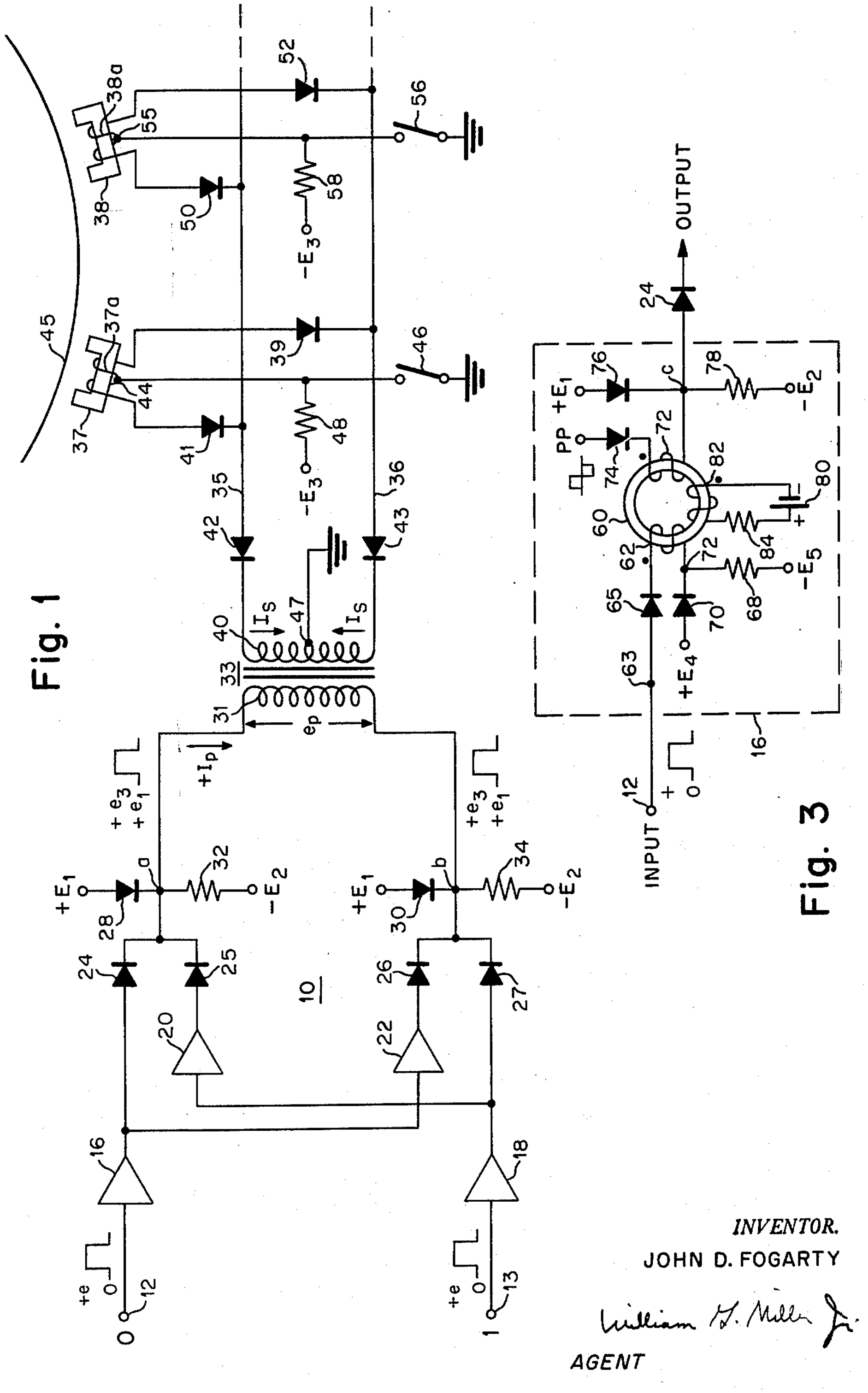
FIG. 1 is a schematic diagram illustrating a driving circuit for writing with either of a number of magnetic heads.
FIG. 3 is a schematic diagram of one form of magnetic amplifier which can be substituted for the amplifiers shown in block diagram form in FIG. 1.

In the arrangement of FIG. 1, the driving circuit 10 utilizes input information at input terminals 12 and 13 to determine the outputs of non-complementing amplifiers 16 and 18. These outputs in turn provide inputs to non-complementing amplifiers 20 and 22. The outputs of pairs of these amplifiers are then buffed together by diodes 24, 25, and 26, 27 to provide signals at output terminals *a* and *b*. These output terminals are each connected in a clamp circuit which comprises a positive potential $+E_1$ connected by diodes 28 and 30 to the respective output terminals *a* and *b*. Output terminals *a* and *b* are also connected to one end of resistors 32 and 34 respectively, which are in turn connected at their other ends to negative potential $-E_2$ to complete the clamp circuits. Terminals *a* and *b* are connected to opposite ends of primary winding 31 of transformer 33 while the secondary 40 is connected at the center-tap 47 to ground. The secondary 40 is also connected at each end by way of lines 35 and 36 to opposite ends of magnetic recording heads 37 and 38 which are adjacent the surface 45 of a magnetic recording material, such as a drum surface. Additional heads can similarly be connected in parallel with heads 37 and 38 as indicated by the extension of lines 35 and 36 by dash lines. Diodes 39 and 41 are connected to opposite ends of the magnetic head 37. The other side of diode 41 is connected to line 35 while the other side of diode 39 is connected to line 36. In both lines 35 and 36 additional isolating diodes 42 and 43 respectively, are provided to allow current flow only in a direction toward the secondary winding 40 of transformer 33.

The magnetic recording head 37 has a center-tapped connection 44 which is connected through switch means 46 to ground potential and which is also connected through resistor 48 to a potential source at $-E_3$.

Magnetic recording head 38, likewise, is connected at each end to diodes 50 and 52, respectively, which diodes have their other terminals connected to lines 35 and 36, respectively. As is the case with magnetic recording head 37, the head 38 has its coil center-tapped at point 55. This point is in turn connected by switch 56 to ground potential and, likewise, is connected by resistor 58 to potential $-E_3$.

The circuit coupling input information presented at terminals 12 and 13 includes amplifiers 16 and 18, the outputs of which are respectively coupled directly to buffing diodes 24 and 27 which are in turn connected to output terminals *a* and *b* respectively. The outputs of amplifiers 16 and 18 are also connected to the inputs of amplifiers 22 and 20 respectively. The outputs of amplifiers 20 and 22 are in turn coupled through diodes 25 and 26 respectively to terminals *a* and *b*.

Figure 2:
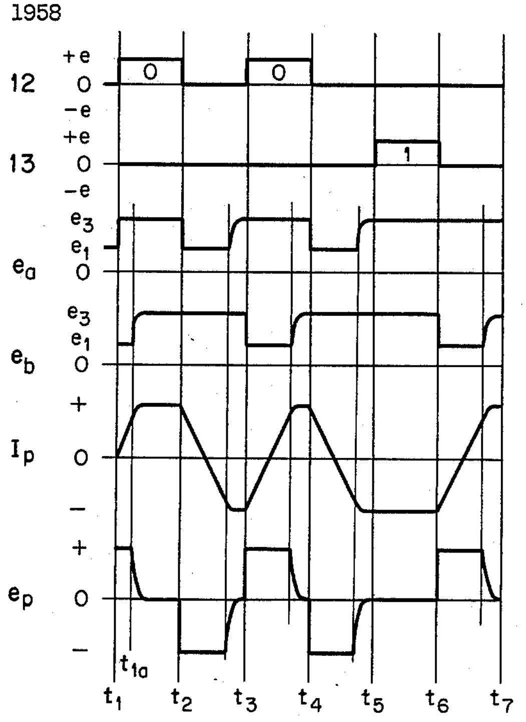
FIG. 2 is a timing diagram showing the current and potential levels in various parts of FIG. 1.

Referring now to FIGURES 1 and 2, it may be seen that the circuit of FIGURE 1 will provide for the energization of a selected one of the magnetic heads 37 or 38 in accordance with inputs representing binary information and provided in the form of pulses at either terminals 12 or 13 depending on the binary quantity being represented. The resulting record will be in the "phase modulation" system of recording. In this system, a binary "0" may be recorded as a cycle of alternate flux patterns in which the first half of the cycle is recorded as a flux pattern oriented in one direction, which may be considered a positive direction, and the second half cycle is recorded as a flux pattern oriented in the opposite or negative direction. In recording a binary "1," however, the orientation of the flux during the first half cycle would be in the negative direction, and the second half cycle would record a flux pattern oriented in a positive direction. In other words, both the binary "0" and the binary "1" are recorded as a cycle of oppositely oriented flux patterns with the phases of the particular cycle representing the "1" and the "0" differing by 180°. In the following description, this type of record will be referred to as the "phase-modulation" system.

If we assume that it is desired to record binary information magnetically and that a computer word to be recorded is made up of information in binary form, the circuit of FIG. 1 may be used. If the first bit is a "0," for example, then there will appear at the terminal 12 a positive pulse causing terminal 12 to go from a zero potential to some positive value $+e$ as shown in FIG. 1. This input pulse produces in the output from amplifier 16, which is of the non-complementing type, a corresponding positive pulse which passes through buffer diode 24 and appears at terminal *a* as a positive pulse. This pulse carries the potential at terminal *a* to a positive value $e_3$.

Terminal *a* will normally be held at a potential $e_1$ by means of a clamp circuit comprised of the positive source of potential $+E_1$ and diode 28 connecting $+E_1$ and terminal *a* and, also, resistor 32 connecting terminal *a* to a negative potential source $-E_2$. Thus, whenever terminal *a* is not carried to a higher potential by an input signal, it will remain at the potential $+e_1$ which will generally be equal to $+E_1$, assuming no forward resistance in diode 28. This clamping action results from the normal current flowing from the source of positive potential $+E_1$ to the source of negative potential $-E_2$.

Another similar clamp circuit is provided for terminal *b* and consists of the same positive and negative potential sources $+E_1$ and $-E_2$ connected by diode 30 and resistor 34. This clamp circuit will normally hold terminal *b* at a potential $e_1$ equal to the potential at terminal *a* when there is no input to either terminal.

Upon occurrence of an input at terminal 12, a positive pulse appears at terminal *a* and carries it to $+e_3$, producing a current flow through resistor 32 and through primary winding 31 of transformer 33. The current which flows through the transformer primary 31 also flows through resistor 34 which thus provides a path for current in shunt with amplifiers 18 and 22.

Referring now to FIG. 2, which is a timing diagram relating the various potential and current levels in the circuit of FIG. 1, it will be evident that the potentials at terminals 12 and 13 are shown in the two curves at the top of FIG. 2. The potential at terminal *a* which is represented as $e_a$ and the potential at terminal *b*, represented at $e_b$, are shown as the two curves in the middle of FIG. 2. The current through the primary 31 ($I_p$) and the potential across the primary 31 ($e_p$) are shown as the lower two curves of FIG. 2. The appropriate potential or current scales are oriented on the vertical co-ordinate and the timing scale on the horizontal co-ordinate.

The time period of a full binary digit cycle is represented as the period between $t_1$ and $t_3$, $t_3$ to $t_5$, and $t_5$ to $t_7$, and $t_2$, $t_4$, and $t_6$ represent the half cycle points. The assumed input pulse at terminal 12 and the resulting rise in potential at terminal *a* are illustrated in FIG. 2 as beginning at time $t_1$ and persisting to $t_2$. If, for purposes of explanation, we assume that the transformer primary 31 acts essentially as a linear inductor having no resistance in its windings, then the current $I_p$ through that winding would build up from zero in a positive direction along a straight line as shown between $t_1$ and $t_{1a}$. Through that period, the potential at terminal *b* remains at $e_1$, and the potential dropped across the primary 31 ($e_p$) remains at a constant value. At point $t_{1a}$, the current $I_p$ flowing through the primary 31 and also through the resistor 34 becomes equal to the current normally flowing through resistor 34 due to the potential difference between $+E_1$ and $E_2$, and at this time, the diode 30 becomes effectively disconnected and terminal *b* continues to rise along an exponential curve corresponding to the $$\frac{L}{R}$$

time constant of the circuit as shown in FIG. 2; until the potential drop across resistor 34 is equal to the potential drop across resistor 32. During the same period, the potential across the primary 31 decreases along a similar exponential curve to zero, and the current $I_p$ approaches a limiting value.

The change in current flow in the transformer primary 31, of course, causes current flow in the secondary 40 of magnitude depending on the transformation ratio of the transformer 33 as established by the ratio between the turns of primary winding 31 and secondary winding 40. If we assume that the switch 46, which may normally be a transistor switching circuit or similar device, has connected the center-tap of head coil 37*a* to ground potential; then the current induced in the upper half of secondary 40 in the direction $I_s$, as shown in FIG. 1, will flow from the ground connection through switch 46, through the left half of the magnetic recording head coil 37*a*, the diode 41, line 35, diode 42 and the top half of the secondary winding 40 to its grounded center-tap 47. As a result of this current flow, the magnetomotive force generated by head 37 will produce in the surface of the magnetic recording material 45 adjacent to head 37, a flux pattern having a certain orientation which for convenience can be considered as positive in direction.

It will also be evident that if the head 38 had been selected prior to the input pulse at terminal 12, as by the closing of switch 56, which may be similar to switch 46, then a similar current flow as previously described for head coil 37*a* would occur in the left hand portion of head coil 38*a*, and the flux pattern in recording surfaces 45 would be the same as that produced by head 37. When switches 46 and/or 56 are opened, it will be evident that the connection of the center-tap of head coils 37*a* and 38*a* through resistors 48 and 58, respectively, to a potential $-E_3$ normally holds the center-tap of the respective head coils at the potential $-E_3$, serving as a back-bias on the diodes in circuit with the heads to assure no undesired currents flowing therein.

The input signal at terminal 12, amplied by amplifier 16 to produce a protential $+e_3$ during time interval $t_1$–$t_2$ at terminal *a*, also produces an input to amplifier 22 which in turn provides, through the buffer diode 26, a signal raising the potential of terminal *b* to $e_3$ during the subsequent period $t_2$–$t_3$. As a result, terminal *b* will be maintained at the potential $e_3$, as shown in FIG. 2, while the potential at terminal *a* has dropped to the clamp value $e_1$. Terminal *a* will remain at potential $e_1$ until the current $I_p$ has built up from a flow in the positive direction, indicated by the arrow in FIG. 1, to a similar maximum value in the negative direction, as illustrated in FIG. 2. The current flowing in a negative direction through the primary 33 will also flow through resistor 32, and when the flow becomes sufficient to bring terminal *a* to the potential $+e_3$ equal to the potential at terminal *b*, the potential across the primary 31 $e_p$ will be zero, and the current will stabilize at a value of similar magnitude but opposite direction to that previously produced during $t_1$–$t_2$.

The change to a negative flow of current through the primary 31 will induce in the lower half of secondary 40 a current flow in a direction shown by the arrow $I_s$. Depending upon which of the two heads, 37 and 38, are connected by their associated switches 46 and 56, respectively, there will be a current flow through the right half of the selected head coils 37*a* or 38*a* and the associated diode 39 or 52. This current will also flow through line 36 and diode 43 through the lower half of the secondary 40 to its grounded center-tap 47. This direction of current flow through either of the heads will produce a magnetomotive force which will orient the flux in the adjacent magnetic recording surface 45 in a negative direction or opposite to the orientation previously effected by the current flow in the left hand portion of the respective head coil as explained previously.

It will thus be seen that, as a result of an input at terminal 12 representing a binary "0," the selected recording head 37 or 38 will produce in adjacent magnetic recording material 45 a cycle of alternating flux patterns in which the flux will be oriented in a positive direction during the first half of the cycle and in a negative direction through the second half of the cycle in response to the alternate raising of the potential at terminal *a* and terminal *b* respectively by an input signal. If the binary "0," recorded as explained above at the beginning of the computer word, is followed by another bit which is also a binary "0," the various potentials and currents will be similar during the cycle between time $t_3$ and $t_5$. For example, the potential at terminal *a* will remain at $e_3$ due to the output of amplifier 16 being held a this value by another input pulse at terminal 12. This potential at terminal *a* will remain during the period $t_3$ to $t_4$ while the current in the primary 31 is changing from a negative direction to a positive direction. As this change is completed, the potential at terminal *b* will have risen as shown in FIG. 2 from the value $e_1$ to $e_3$ at which point the current $I_p$ will be stabilized and the potential $e_p$ across the primary 31 will be zero as shown. During the next half cycle between $t_4$ and $t_5$, there will again be an output from amplifier 22 which will maintain terminal *b* at the potential $e_3$ as the terminal *a* falls to $e_1$. As a result of the input at the terminal *b*, the current $I_p$ will again gradually shift to a negative direction as the inductance of the primary 31 is overcome. When the current through the primary is again stabilized, the potential $e_p$ across the primary will fall to zero. The potential at the time $t_5$ at terminal *a* will then be the same as the potential at terminal *b*.

The potential at terminal *a* at the time $t_5$ namely, $e_3$ will continue at that value during the subsequent half cycle since the negative-going current in the primary 36 will be maintained at its limited negative value by the inductance of the primary 31, and the potential at terminal *a* will not, therefore, decrease to its normal value, $e_1$. Maintenance of the current through the primary at the limited negative value in the period $t_5$ to $t_6$, of course, causes the potential $e_p$ across the primary 31 to remain at zero, as shown in FIG. 2. It will also be noted from the following explanation of the period $t_6$–$t_7$ that the limiting of the current $I_p$ makes it possible for the positive going current in the period $t_6$–$t_7$ to reach a similar limited positive value.

At time $t_6$, the output from amplifier 18 will have produced a potential $e_3$ at terminal *a* by way of amplifier 20 and buffer diode 25. This potential will thus maintain terminal *a* at the potential which existed during the period $t_5$ to $t_6$. The potential at point *b*, however, goes to the clamped value $e_1$ at $t_6$.

During the period $t_6$ to $t_7$, the current through the primary 31 will gradually reverse direction in response to the input to terminal *a*, and when the current through resistor 34 brings terminal *b* above the potential $e_1$, the potential at terminal *b* rises along the exponential curve shown in FIG. 2 to the value $e_3$. Upon reaching $e_3$, terminal *b* will be at the same potential as terminal *a*, and current flow in the primary 31 will have been stablized with the potential $e_p$ across the primary simultaneously falling to zero along an exponential curve, also shown in FIG. 2.

It is evident that in response to $I_p$ during $t_5$–$t_6$, there is induced in the secondary 40 of transformer 33 a current $I_s$ in the lower part of the secondary, which current will correspond to the secondary currents resulting from the negative-going currents produced in the primary 31 during periods $t_2$ to $t_3$ and the periods $t_4$ to $t_5$. As a result of primary currents $I_p$ in the subsequent half cycle; namely $t_6$–$t_7$, there will be induced in the top portion of the secondary 40 a current $I_s$, as shown in FIG. 1, which will be similar to that induced as a result of the primary currents during the periods $t_1$–$t_2$ and $t_3$–$t_4$. The sequence in which the magnetic heads 37 and 38 are energized by current in the left and right hand half of their respective coils 37*a* and 38*a* is thus opposite for the binary "1" as was the case for the binary "0".

It will, of course, be understood that the secondary current $I_s$, which flows through the magnetic head coils 37*a* or 38*a*, will be generaly similar to the current $I_p$ flowing in the primary 31 except for the effect of the transformation ratio and any phase shift produced by the transformer 33 and other components of the circuit connected to secondary 40.

From the above description, it can be seen that the continuous recording of successive bits having the same binary value will provide an alternating current through the recording head having a certain frequency while the transition between the binary "0" and the binary "1" in successive bits will produce a record having a frequency one-half that produced by successive bits of the same value.

Utilizing the circuit of FIG. 1, it is possible to use a relatively high value of $e_3$ in order to overcome the induction of the primary 31 rapidly and thus produce a fast rise in the current through the heads 37 and 38. This fast rise can be accomplished without sacrificing the inherent features of the driving circuit 10 since the current through the primary 31 will be limited to that which will produce across either resistor 32 or 34 a potential equal to the driving potential at terminal *b* or *a*; for when terminal *a* or terminal *b* are at the same potential, the current through the primary 31 is stabilized.

The values of resistors 32 and 34 and their associated negative potential sources $-E_2$ may desirably be chosen so that upon application of the potential $e_3$ at either terminal *a* or *b* the current flowing through the respective resistors 32 and 34 will be equal to the desired current through the primary 31 as may be required by the transformation ratio of the transformer 33 and the parameters of the secondary circuit to provide the desired writing current through the head coils 37*a* and 38*a*. The resistors 32 and 34 thus act to limit the current through primary 31 to that value required for proper writing by heads 37 and 38 on surface 45.

In order to obtain the maximum dependability in a circuit of this type, it is desirable that the amplifiers 16, 18, 20 and 22 be solid-state amplifiers. More particularly, they may be magnetic amplifiers of the type shown in FIG. 4 of Patent 2,709,798, issued to W. F. Steagall on May 31, 1955. They may also be magnetic amplifiers of other suitable types as, for example, the type illustrated as amplifier 16 in FIG. 3.

In the circuit of FIG. 3, the core 60 may desirably have a rectangular hysteresis loop and be provided with an input coil 62 which receives input pulses of the type illustrated at terminal 63. These input pulses may be positive pulses supplying current through the diode 65 to the coil 62 and thence through resistor 68 to a negative potential $-E_5$ for flipping the core 60 to positive saturation. Also connected to the input circuit is a potential $+E_4$ providing steady current through diode 70 and resistor 68 to maintain the terminal 72 at a potential of approximately $+E_4$ to allow core resetting during the normal operation of the magnetic amplifier. When an input is provided at point 63 as from terminal 12, the core 60 is, as mentioned above, saturated in a positive direction. This flipping of core 60 will normally be followed by a power pulse PP which will produce a current flow in output winding 72 by way of diode 74 which will tend to take the core 60 further into the positive saturation region. Core 60, therefore, provides little impedance to current flow from the power pulse source, and an output will appear at point *c*. This amplifier is, therefore, of the non-complementing variety.

The power pulses PP of the amplifiers 16 and 18 would desirably have their positive portions occurring during time periods $t_1$–$t_2$, $t_3$–$t_4$, and $t_5$–$t_6$ while the positive portions for amplifiers 20 and 22 should occur during alternate time periods $t_2$–$t_3$, $t_4$–$t_5$, and $t_6$–$t_7$ to produce the desirable push-pull effect in driving circuit 10.

The output circuit of the magnetic amplifier of FIG. 3 utilizes a clamp circuit similar to that previously described in FIG. 1 in which a positive potential $+E_1$ normally supplies a clamping current through diode 76 and resistor 78 to a negative supply $-E_2$ which will tend to maintain terminal $c$ at $e_1$ generally corresponding to the potential $E_1$. The clamp circuit in this case serves as a suppressor for sneak currents in winding 72. Point $c$ will then be connected, as for example in FIG. 1, through buffing diode 24 to terminal $a$. The power pulse will thus produce at terminals $c$ and $a$ a potential rise to $+e_3$ in response to an input at terminal 63.

The core 60 is reset to negative remanence by the potential of battery 80 producing current flow through reset coil 82 via resistor 84. The reset current will be effective upon the disappearance of positive potential in the power pulse. In normal operation, core 60 will, therefore, be alternately flipped from the negative remanent point to a positive remanent point, and then from that point to the negative remanent point again due to the steady reset current from battery 80 and resistor 84. When an input pulse appears, however, the reset will not be effective, and the power pulse which follows an input pulse finds little impedance to current flow from core 60 and thus produces an output at terminal $c$.

Figure 4:
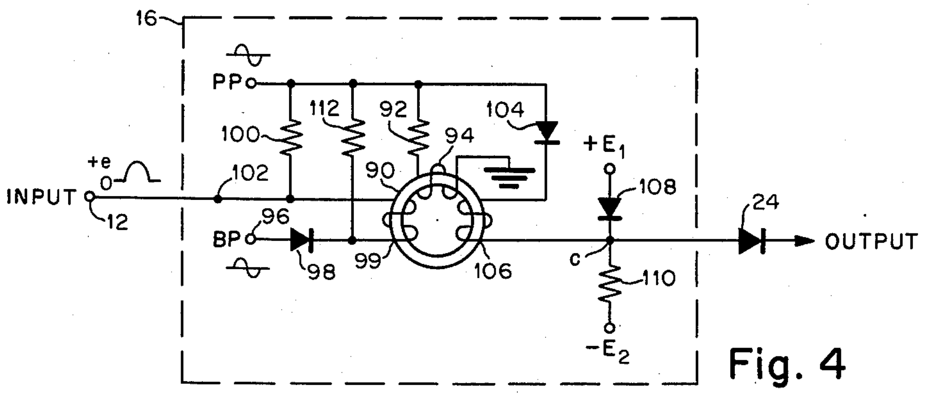
FIG. 4 is a schematic diagram of another form of magnetic amplifier which can be substituted for the amplifiers shown in block diagram form in FIG. 1.
Figure 5:
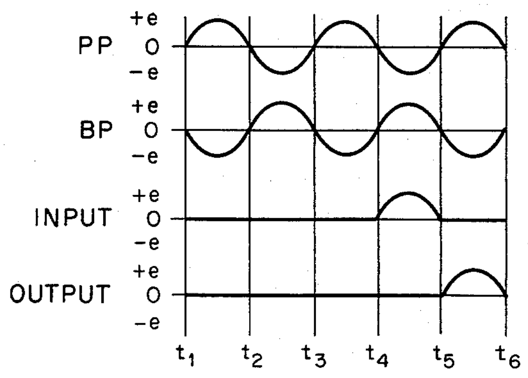
FIG. 5 is a timing diagram for the amplifier of FIG. 4.

Another possible magnetic amplifier circuit, which may be substituted for the amplifiers 16, 18, 20 and 22, is shown in FIG. 4. Its associated timing diagram is shown in FIG. 5.

The magnetic amplifier of FIG. 4 may be advantageously used to supply sine wave outputs where it is desired to use that type of wave form in a phase-modulation system. In FIG. 4, the core 90 is normally reset by a combination of the current flow through coils 94 and 99 during a negative portion of the power pulse, such as is illustrated in FIG. 5, during periods $t_2$–$t_3$ and $t_4$–$t_5$. The current through the reset coil 94 and resistor 92 serves only to partially reset the core 90. The additional energy required for resetting is supplied by the blocking pulse source 96 which is shown in FIG. 5 as a positive potential during the negative excursion of the power pulse and will, therefore, supply current through the diode 98, input coil 99, and resistor 100.

Upon the occurrence of the input at terminal 102 as from terminal 12, which may be at positive half-cycle of a normal sine wave, the effect of the blocking pulse in resetting the core 90 will be cancelled, and the core will not be reset as would normally be the case. The input is illustrated in FIG. 5 during the time period $t_4$–$t_5$.

A positive portion of the power pulse during the period $t_5$–$t_6$ following the existence of an input during the period $t_4$–$t_5$ will thus find the core in the unreset condition and as a result, current flow may readily occur through diode 104 and output coil 106 to terminal $c$ with little impedance being presented by the core 90, for the current in the coil 106 will be in a direction to carry the core 90 further into its positive saturation region. Thus, terminal $c$ will be raised from the normally existing $e_1$ as provided by the clamp circuit. This clamp circuit is similar to those previously described and comprises diode 108 and resistor 110 in series between sources $+E_1$ and $-E_2$. The resistor 112 is provided to establish a current path for the input current which may flow through input coil 99. The terminal $c$, of course, as is the case with FIG. 3, corresponds to the output of the amplifier and will produce by way of the buffer diode 24 a rise in potential of terminal $a$ in response to an input at terminals 12. The output at terminal $c$, represented by the lower curve in FIG. 5, will occur during the period $t_5$–$t_6$.

The amplifiers 16, 18, 20 and 22, illustrated in FIGS. 3 and 4 as being magnetic amplifiers, may be transistor amplifiers or other types of amplifiers. These amplifiers are, however, desirably of the type utilizing solid-state amplifying devices to provide the greater dependability desired in computers.

The power pulses for amplifiers 16 and 18 should differ in phase from those of amplifiers 20 and 22 as explained for FIG. 3.

It will be evident to those skilled in the art that the magnetic amplifiers of FIGS. 3 and 4 may each be used with either sine wave power pulses or with square wave power pulses depending on the type of wave form which it is desirable to record. Still other wave forms may be utilized for input or power pulses depending upon the desired output wave form.

It will also be evident to those skilled in the art that the sources $+E_1$ in FIG. 1 for the clamping circuits could for certain types of magnetic amplifiers be another potential including ground potential. Likewise, the potential source $-E_2$ and the resistors 32 and 34 in FIG. 1 could have any of a number of values depending on the current flows which can be tolerated in the circuit.

What is claimed is:

1. A driving circuit to provide alternating writing current for a magnetic head in either a first or second phase comprising a first and second source of signals corresponding respectively to information of a first or second value, first and second magnetic amplifiers respectively coupled to said first and second source of signals to produce a first output signal from either said first or said second magnetic amplifiers during a first period of time in response to energization from the corresponding one of said sources of signals, third and fourth magnetic amplifiers coupled to produce a second output signal from said third and fourth magnetic amplifiers respectively in response to a first output from said second and first magnetic amplifiers respectively during a second period of time subsequent to said first period, a transformer having a primary and a secondary, said secondary coupled to said magnetic head, first buffer means connecting said primary at one end to the output of both said first and said third magnetic amplifiers, second buffer means connecting said primary at its other end to the output of both the said second and said fourth magentic amplifiers, first and second impedances each coupled between a different end of said primary and a potential source of polarity opposite that of said sources of signals for carrying the current flowing through said primary in shunt to those of said magnetic amplifiers not producing an output signal.

2. A driving circuit as in claim 1 in which said first and second impedances are of value to limit the maximum current flow in said transformer primary during said first and second periods to a value allowing reversal of said current flowing through said primary to a similar value during any subsequent period.

3. A drive circuit for producing a record on magnetizable material comprising a first and second source of signals, a magnetic recording head circuit having two terminals only, circuit means connecting each of said sources of signals with a separate one of said terminals to energize said head to produce a magnetomotive force in a first and second direction respectively in response to energization of said first and second sources of signals, a clamp circuit means associated with each of said first and second sources of signals, said clamp circuit means each including a first and second potential source, diode and impedance means serially connected to couple said first and second potential source of each of said clamp circuits for current flow therebetween, means coupling said terminals of said recording head individually to the junction between said diode and said impedance means of associated ones of said clamp circuit means whereby said impedance means each provide a current path for current passing through said circuit means from that one of said first and second source of signals associated with the other of said clamp circuit means.

4. A driving circuit to provide alternating writing current for a magnetic head in either a first or second phase comprising a first and second source of signals corresponding respectively to information of a first or second value, first and second magnetic amplifiers respectively coupled to said first and second source of signals to produce a first output signal from either said first or said second magnetic amplifiers during a first period of time in response to energization from the corresponding one of said sources of signals, third and fourth magnetic amplifiers coupled to produce a second output signal from said third and fourth magnetic amplifiers respectively in response to a first output from said second and first magnetic amplifiers respectively during a second period of time subsequent to said first period, a transformer having a primary and a secondary, said secondary coupled to said magnetic head, first buffer means connecting said primary at one end to the output of both said first and said third magnetic amplifiers, second buffer means connecting said primary at its other end to the output of both the said second and said fourth magnetic amplifiers, first and second current limiting circuits coupled respectively to opposite ends of said primary, each of said current limiting circuits including an impedance coupled between the corresponding end of said primary and a first potential source of polarity opposite that of said sources of signals for carrying current flowing through said primary in shunt to those of said magnetic amplifiers connected to said corresponding end of said primary and a diode coupled to carry current between a second potential source of magnitude above said first potential source and said corresponding end of said primary.

5. A driving circuit to provide writing current for a magnetic head in either a first or second direction comprising a first and second source of signals corresponding respectively to information of a first or second value, first and second magnetic amplifiers respectively coupled to said first and second source of signals to produce an output signal from either said first or second magnetic amplifier in response to energization from the corresponding one of said source signals, a transformer having a primary and a secondary, said secondary being coupled to said magnetic head one end of said primary coupled to the output of said first magnetic amplifier and the other end of said primary coupled to the output of said second magnetic amplifier, first and second impedances each coupled between a different end of said primary and a first potential source of polarity opposite that of said source during said signals for carrying current flow through said amplifier in shunt to that one of said magnetic amplifiers not producing an output signal, and a first and second diode each coupled between a different end of said primary and a second potential source of magnitude less than that of said source during said signals, said diode being so oriented that current flow from said second to said first potential source normally maintains the corresponding end of said primary at a fixed potential thereby preventing said first and second impedances from impeding the flow of current through said magnetic head except when said current exceeds in the value of the normal current flow between said second and said first potential.

References Cited in the file of this patent

UNITED STATES PATENTS

| | | |
|---|---|---|
| 2,838,675 | Wanlass | June 10, 1958 |
| 2,879,500 | Vaughan | Mar. 24, 1959 |
| 2,889,541 | Huss et al. | June 2, 1959 |
| 2,898,578 | Steele | Aug. 4, 1959 |
| 2,900,215 | Schoen | Aug. 18, 1959 |
| 2,927,304 | Paquin | Mar. 1, 1960 |